United States Patent
Bonczar

(10) Patent No.: US 11,324,194 B2
(45) Date of Patent: May 10, 2022

(54) ANIMAL FEEDER REFILLING ASSEMBLY

(71) Applicant: Jo-Ann Bonczar, Keene, NH (US)

(72) Inventor: Jo-Ann Bonczar, Keene, NH (US)

( * ) Notice: Subject to any disclaimer, the term of this patent is extended or adjusted under 35 U.S.C. 154(b) by 253 days.

(21) Appl. No.: 16/732,460

(22) Filed: Jan. 2, 2020

(65) Prior Publication Data

US 2021/0204510 A1 Jul. 8, 2021

(51) Int. Cl.
*A01K 5/01* (2006.01)

(52) U.S. Cl.
CPC .................. *A01K 5/0114* (2013.01)

(58) Field of Classification Search
CPC ........... A01K 5/01; A01K 5/0114; G01N 1/20
USPC ......... 73/864.51; 248/311.2, 313; 119/51.01, 119/51.03, 57.91, 59, 65, 66, 67, 68, 69
See application file for complete search history.

(56) References Cited

U.S. PATENT DOCUMENTS

| | | | |
|---|---|---|---|
| 1,078,005 A | 11/1913 | Skanks | |
| 1,473,852 A | 11/1923 | Harrell | |
| 1,518,160 A * | 12/1924 | O'Hara | G01N 1/12 73/61.71 |
| 2,699,050 A * | 1/1955 | Mackay | A47L 13/52 15/257.7 |
| 4,454,775 A * | 6/1984 | Ellis | G01N 33/182 422/405 |
| 4,641,873 A * | 2/1987 | Nurnberger | E01H 1/1206 294/1.4 |
| 4,771,924 A | 9/1988 | Aylor | |
| 5,862,777 A | 1/1999 | Sweeney | |
| 6,164,710 A * | 12/2000 | Shibuya | A01K 23/005 15/257.3 |
| 6,964,353 B1 | 11/2005 | Lamerson | |
| 7,296,538 B1 * | 11/2007 | Pridgen | A01K 5/0114 119/59 |
| 7,735,886 B2 * | 6/2010 | Tsukamoto | A01K 23/005 294/1.5 |
| D662,268 S * | 6/2012 | Pearcey | D30/162 |
| 9,139,970 B1 * | 9/2015 | Little | E01H 1/1206 |
| 9,854,787 B1 * | 1/2018 | Hayes | A01K 23/005 |
| 2010/0025496 A1 | 2/2010 | Fitzsimons | |
| 2016/0302482 A1 * | 10/2016 | O'Loughlin | A24F 19/0092 |

FOREIGN PATENT DOCUMENTS

WO    WO2008044228    4/2008

* cited by examiner

*Primary Examiner* — Ebony E Evans

(57) ABSTRACT

An animal feeder refilling assembly for refilling elevated animal feeders includes a shaft. The shaft has a first end, a second end and an outer surface. A container is pivotably attached adjacent to the second end of the shaft. The container has a bottom wall with a perimeter wall. The perimeter wall has a top edge defining an opening. The container is pivotable between a load position wherein the perimeter wall rests parallel to the shaft with the bottom wall adjacent to the shaft, and an unload position wherein the opening pivots over the second end. A handle is slidingly engaged with the outer surface of the shaft and positioned adjacent to the first end. A linkage is attached to the handle and extends to pivotably couple to an exterior surface of the container. The linkage moves the container between the load position and the unload position.

12 Claims, 4 Drawing Sheets

US 11,324,194 B2

ANIMAL FEEDER REFILLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feeder refill devices and more particularly pertains to a new feeder refill device for refilling elevated animal feeders. The disclosure includes both a sliding handle and rigid linkage to move the container.

(2) Description of Related Art Including Information Disclosed Under 37 CFR 1.97 and 1.98

The prior art relates to feeder refill devices.

BRIEF SUMMARY OF THE INVENTION

An embodiment of the disclosure meets the needs presented above by generally comprising a shaft. The shaft has a first end, a second end and an outer surface extending between the first end and the second end. The outer surface has a first side and a second side. A container is pivotably attached to the first side adjacent to the second end of the shaft. The container has a bottom wall and a perimeter wall. The perimeter wall is attached to and extends upwardly from the bottom wall. The perimeter wall has a top edge defining an opening into an interior of the container. The container is pivotably attached to the second end such that the container is positionable in a load position wherein the perimeter wall rests parallel to the shaft with the bottom wall adjacent to the shaft, or in an unload position wherein the opening pivots over the second end toward an inverted position. A handle is slidingly engaged with the outer surface of the shaft. The handle is positioned adjacent to the first end of the shaft. A linkage is attached to the handle and extends to pivotably couple to an exterior surface of the container. The linkage moves the container between the load position and the unload position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
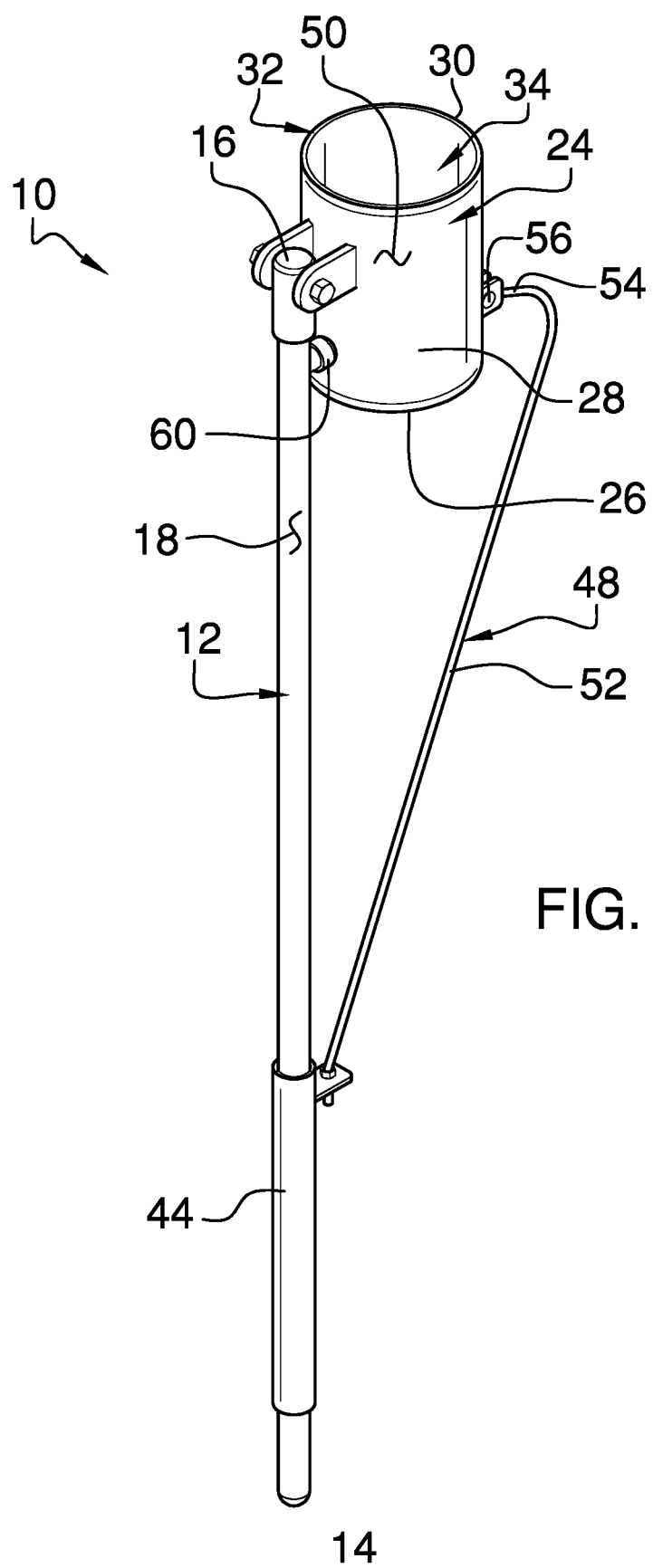
FIG. 1 is a front isometric view of an animal feeder refilling assembly according to an embodiment of the disclosure.
Figure 2:
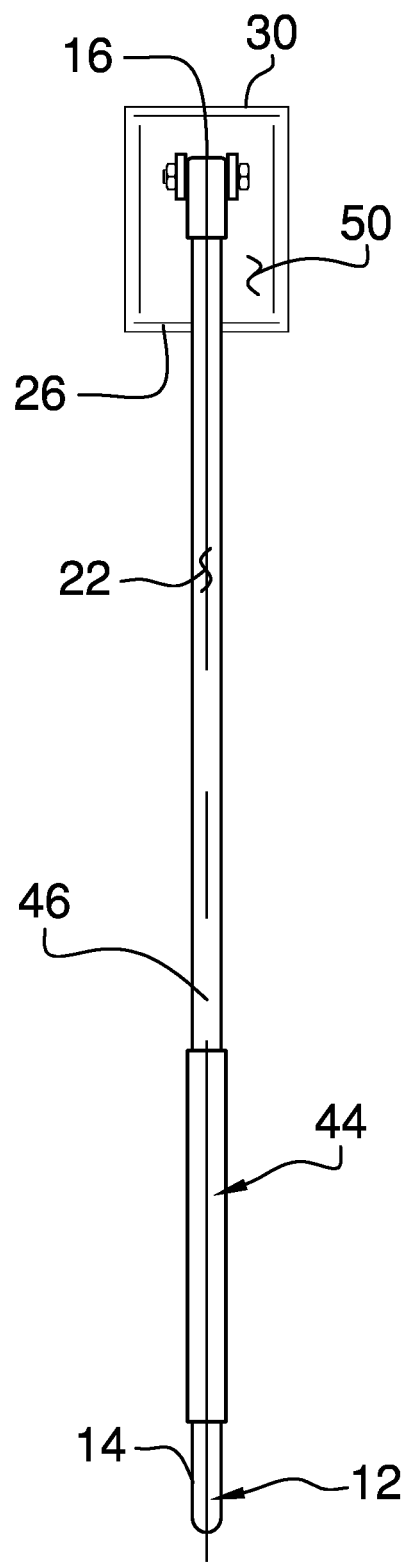
FIG. 2 is a rear side view of an embodiment of the disclosure.
Figure 3:
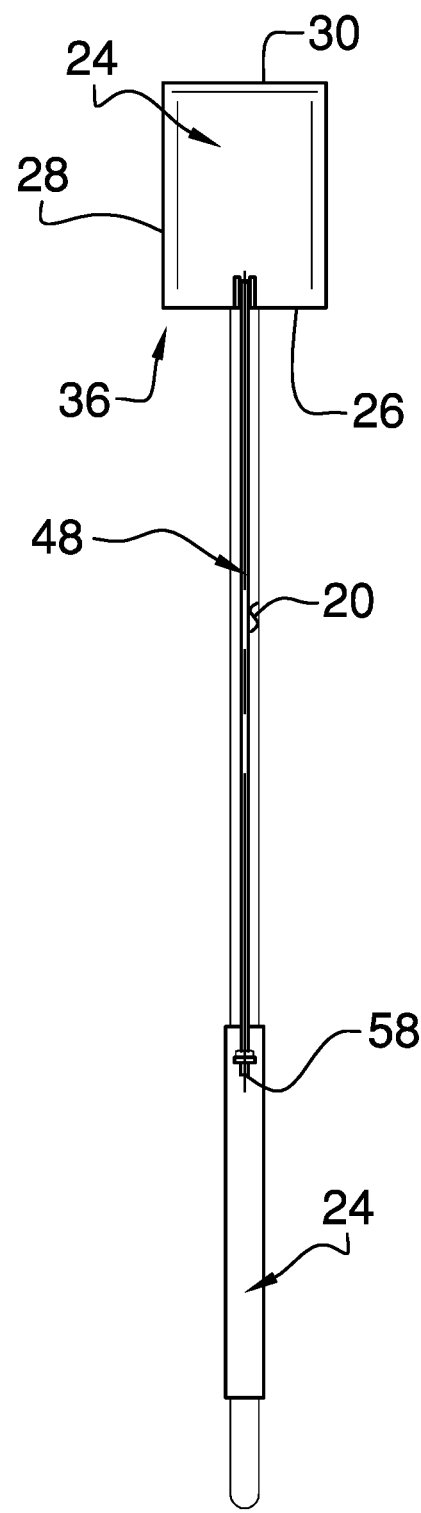
FIG. 3 is a front side view of an embodiment of the disclosure.
Figure 4:
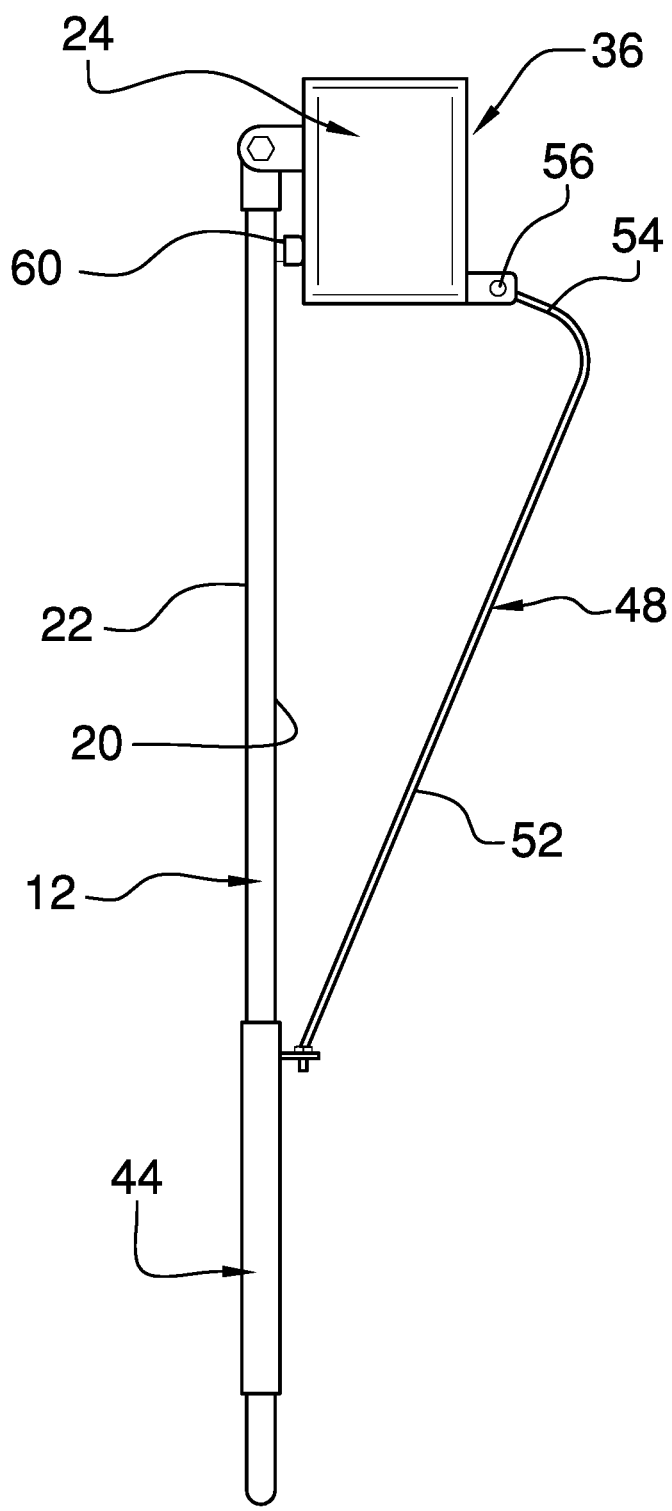
FIG. 4 is a side view of an embodiment of the disclosure.
Figure 5:
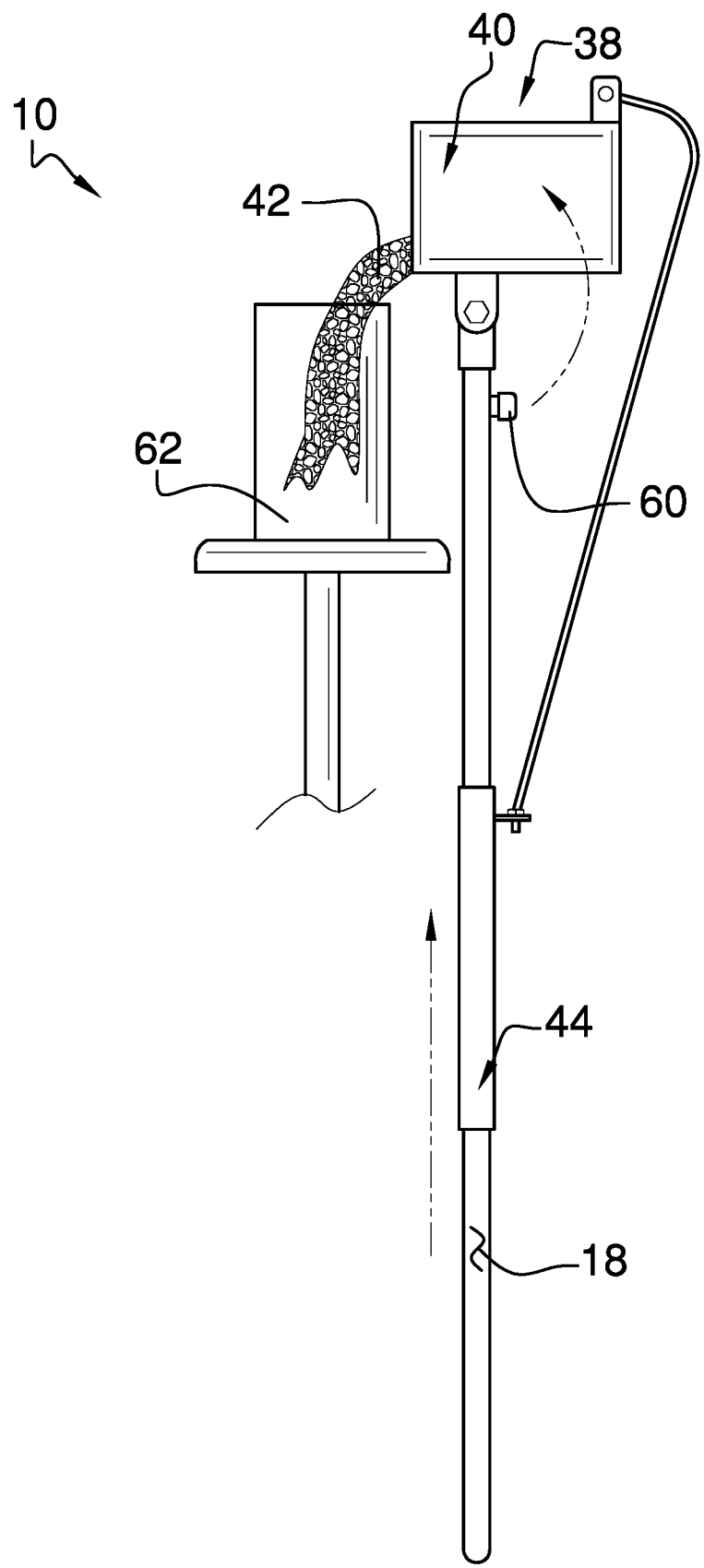
FIG. 5 is an in-use view of an embodiment of the disclosure.

With reference now to the drawings, and in particular to FIGS. 1 through 5 thereof, a new feeder refill device embodying the principles and concepts of an embodiment of the disclosure and generally designated by the reference numeral 10 will be described.

As best illustrated in FIGS. 1 through 5, the animal feeder refilling assembly 10 generally comprises a shaft 12. The shaft 12 has a first end 14, a second end 16 and an outer surface 18 extending between the first end 14 and the second end 16. The outer surface 18 has a first side 20 and a second side 22. The shaft 12 is cylindrical in shape. The shaft 12 is made up of a rigid material including wood, metal, rigid plastic, or any other conventionally available rigid material.

A container 24 is pivotably attached to the first side 20 adjacent to the second end 16 of the shaft 12. The container 24 has a bottom wall 26 and a perimeter wall 28. The perimeter wall 28 is attached to and extends upwardly from the bottom wall 26. The perimeter wall 28 has a top edge 30 defining an opening 32 into an interior 34 of the container 24. The container 24 is pivotably attached to the second end 16. The container 24 is pivotable between a load position 36, wherein the perimeter wall 28 rests parallel to the shaft 12 with the bottom wall 26 is adjacent to the shaft 12, and an unload position 38, wherein the opening 32 pivots over the second end 16 toward an inverted position 40. The load position 36 has the opening 32 positioned above the bottom wall 26 such that the container 24 is configured to hold a fill 42. The unload position 38 has the container 24 in the inverted position 40 wherein the bottom wall 26 is above the opening 32 such that the container 24 is configured to empty the fill 42 from the container 24. The fill 42 may comprise liquid or dry materials.

A handle 44 is slidingly engaged with the outer surface 18 of the shaft 12. The handle 44 is positioned adjacent to the first end 14 of the shaft 12. The handle 44 is cylindrical in shape. The handle 44 shape may change to accommodate the shaft shape. The handle 44 is slidingly engaged to share a central axis 46 with the shaft 12 and to slide along the central axis 46.

A linkage 48 is attached to the handle 44 and extends to pivotably couple to an exterior surface 50 of the container 24. The linkage 48 has a first section 52 extending between the handle 44 and a second section 54. The second section 54 extends between the first section 52 and the container 24. The linkage 48 is pivotably coupled to the exterior surface 50 via a pin 56 mounted opposite the shaft 12. The linkage 48 moves the container 24 into the load position 36 when the handle 44 is positioned adjacent to the first end 14 of the shaft 12. The linkage 48 moves the container 24 into the unload position 38 when the handle 44 is moved toward the second end 16. The first section 52 extends away from the shaft 12 at an increasing distance between the first end 14 and the second end 16. The second section 16 extends away from the first section 52 toward the shaft 12 to pivotably couple to the container 24. The first section 52 and the second section 54 of the linkage 48 have axis 58 that are coplanar with the central axis 46 of the shaft 12. The linkage 48 is made of a rigid material including wood, metal, rigid plastic, or any conventionally available rigid material.

A spacer 60 is attached to and extends away from the first side 20 of the shaft 12 toward the container 24. The spacer 60 is positioned nearer the second end 16 of the shaft 12 than the first end 14 of the shaft 12. The spacer 60 contacts and supports the container 24 when the container 24 is in the load position 36. The spacer 60 may be made of the same material or be a unitary part of the shaft 12 or container 24. The spacer 60 may include additional features to cushion the container 24, including an elastomeric pad or a pad made of another conventionally available material suitable to reduce the impact between the spacer 60 and container 24 when the container 24 is placed in the load position 36.

In use, the container 24 is loaded with the fill 42 in the load position 36. Once the container 24 is adjacent to an animal feeder 62 the handle 44 is moved toward the second end 16, moving the container 24 into the unload position 38. The fill 42 empties from the container 24 and the handle 44 is then moved to place the container 24 back into the load position 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An elevated feeder refill assembly comprising:
    a shaft having a first end, a second end and an outer surface extending between said first end and said second end, said outer surface having a first side and a second side;
    a container being pivotably attached to said first side adjacent to said second end of said shaft, said container having a bottom wall and a perimeter wall, said perimeter wall being attached to and extending upwardly from said bottom wall, said perimeter wall having a top edge defining an opening into an interior of said container, said container being pivotably attached to said second end such that said container is positionable in a load position wherein said perimeter wall rests parallel to said shaft with said bottom wall being adjacent to said shaft or in an unload position wherein said opening pivots over said second end toward an inverted position;
    a handle being slidingly engaged with said outer surface of said shaft, said handle being positioned adjacent to said first end of said shaft; and
    a linkage being attached to said handle and extending to pivotably couple to an exterior surface of said container, said linkage moving said container between said load position and said unload position;
    wherein said linkage has a first section extending between said handle and a second section, said second section extending between said first section and said container; and
    wherein said first section extends away from said shaft at an increasing distance between said first end and said second section, said second section extending away from said first section toward said shaft to pivotably couple to said container.

2. The elevated feeder refill assembly according to claim 1, wherein said shaft is cylindrical in shape.

3. The elevated feeder refill assembly according to claim 2, wherein said handle is cylindrical in shape.

4. The elevated feeder refill assembly according to claim 1, wherein said load position has said opening being positioned above said bottom wall such that said container is configured to hold a fill.

5. The elevated feeder refill assembly according to claim 1, wherein said unload position has said container being in said inverted position having said bottom wall being above said opening such that said container is configured to empty the fill from said container.

6. The elevated feeder refill assembly according to claim 1, wherein said linkage is pivotably coupled to said exterior surface via a pin mounted opposite said shaft.

7. The elevated feeder refill assembly according to claim 1, wherein said linkage moves said container into said load position when said handle is positioned adjacent to said first end of said shaft, said linkage moving said container into said unload position when said handle is moved toward said second end.

8. The elevated feeder refill assembly according to claim 1, wherein said first section, said second section and a central axis of said shaft are coplanar.

9. The elevated feeder refill assembly according to claim 1, wherein a spacer is attached to and extends away from said first side of said shaft toward said container.

10. The elevated feeder refill assembly according to claim 9, wherein said spacer is positioned nearer said second end of said shaft than said first end of said shaft.

11. The elevated feeder refill assembly according to claim 10, wherein said spacer contacts and supports said container when said container is in said load position.

12. An elevated feeder refill assembly comprising:
a shaft having a first end, a second end and an outer surface extending between said first end and said second end, said outer surface having a first side and a second side, said shaft being cylindrical in shape;
a container being pivotably attached to said first side adjacent to said second end of said shaft, said container having a bottom wall and a perimeter wall, said perimeter wall being attached to and extending upwardly from said bottom wall, said perimeter wall having a top edge defining an opening into an interior of said container, said container being pivotably attached to said second end such that said container is positionable in a load position wherein said perimeter wall rests parallel to said shaft with said bottom wall being adjacent to said shaft or in an unload position wherein said opening pivots over said second end toward an inverted position, said load position having said opening being positioned above said bottom wall such that said container is configured to hold a fill, said unload position having said container being in said inverted position having said bottom wall being above said opening such that said container is configured to empty the fill from said container;
a handle being slidingly engaged with said outer surface of said shaft, said handle being positioned adjacent to said first end of said shaft, said handle being cylindrical in shape;
a linkage being attached to said handle and extending to pivotably couple to an exterior surface of said container, said linkage having a first section extending between said handle and a second section, said second section extending between said first section and said container, said linkage being pivotably coupled to said exterior surface via a pin mounted opposite said shaft, said linkage moving said container into said load position when said handle is positioned adjacent to said first end of said shaft, said linkage moving said container into said unload position when said handle is moved toward said second end, said first section extending away from said shaft at an increasing distance between said first end and said second section, said second section extending away from said first section toward said shaft to pivotably couple to said container; and
a spacer being attached to and extending away from said first side of said shaft toward said container, said spacer being positioned nearer said second end of said shaft than said first end of said shaft, said spacer contacting and supporting said container when said container is in said load position.

* * * * *